United States Patent
Jo et al.

(10) Patent No.: US 11,754,172 B2
(45) Date of Patent: Sep. 12, 2023

(54) POWERTRAIN-COOLING SYSTEM OF HYBRID VEHICLE

(71) Applicants: Hyundai Motor Company, Seoul (KR); Kia Corporation, Seoul (KR)

(72) Inventors: Se Hwan Jo, Bucheon-si (KR); Seong Min Son, Pohang-si (KR); Kyung Moo Lee, Yongin-si (KR); Bong Uk Bae, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 192 days.

(21) Appl. No.: 17/379,028

(22) Filed: Jul. 19, 2021

(65) Prior Publication Data

US 2022/0268355 A1 Aug. 25, 2022

(30) Foreign Application Priority Data

Feb. 22, 2021 (KR) .......................... 10-2021-0023286

(51) Int. Cl.
*F16H 57/04* (2010.01)
*B60K 6/22* (2007.10)
*B60K 1/00* (2006.01)

(52) U.S. Cl.
CPC .......... *F16H 57/0476* (2013.01); *B60K 6/22* (2013.01); *F16H 57/0413* (2013.01); *F16H 57/0435* (2013.01); *F16H 57/0436* (2013.01); *F16H 57/0473* (2013.01); *B60K 2001/003* (2013.01)

(58) Field of Classification Search
CPC ............. F16H 57/0476; F16H 57/0413; F16H 57/0435; F16H 57/0436; F16H 57/0473; F16H 61/0251; B60K 6/22; B60K 2001/003; B60K 6/442; B60K 17/02; B60K 2001/006; B60K 11/02; B60Y 2400/78; B60Y 2200/92; B60Y 2306/05; B60W 10/30; B60W 10/02; B60W 10/08; B60W 10/10; B60W 20/00
See application file for complete search history.

(56) References Cited

U.S. PATENT DOCUMENTS

2015/0057858 A1* 2/2015 Nitta .................. F01M 1/02
701/22

FOREIGN PATENT DOCUMENTS

KR 10-2019-0029806 A 3/2019

* cited by examiner

*Primary Examiner* — Jacob M Amick
*Assistant Examiner* — Charles J Brauch
(74) *Attorney, Agent, or Firm* — MORGAN, LEWIS & BOCKIUS LLP

(57) ABSTRACT

A powertrain-cooling system of a hybrid vehicle may include an electric oil pump, a pressure control valve, which includes an input port receiving fluid discharged from the electric oil pump, an output port outputting the fluid to a transmission while adjusting the pressure of the fluid, and a drain port discharging a portion of the fluid in accordance with adjustment of the pressure of the fluid, a first motor cooling path connecting the drain port of the pressure control valve to a first motor forming a hybrid powertrain, and a controller electrically connected to the electric oil pump and configured for controlling the electric oil pump to cool the transmission and the first motor.

15 Claims, 8 Drawing Sheets

POWERTRAIN-COOLING SYSTEM OF HYBRID VEHICLE

CROSS-REFERENCE TO THE RELATED APPLICATION

The present application claims priority to Korean Patent Application No. 10-2021-0023286, filed on Feb. 22, 2021, the entire contents of which is incorporated herein for all purposes by this reference.

BACKGROUND OF THE INVENTION

Field of the Invention

The present invention relates to a system for cooling a powertrain of a hybrid vehicle.

Description of Related Art

Since a hybrid powertrain uses a motor in addition to an engine, it is required to cool the motor. To this end, a separate cooling device for cooling a motor may be provided. Alternatively, a hybrid powertrain may be configured such that a motor is cooled using a device for lubricating and cooling a transmission.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain-cooling system of a hybrid vehicle, which is configured for cooling a motor, forming a hybrid powertrain, simultaneously with a transmission without a separate cooling device, of increasing motor-cooling performance by controlling the flow rate of cooling fluid supplied to the motor separately from the flow rate of cooling fluid supplied to the transmission, and of improving the fuel efficiency of the vehicle by minimizing drive loss of an electric oil pump configured for supplying the cooling fluid.

In accordance with various aspects of the present invention, the above and other objects may be accomplished by the provision of a powertrain-cooling system of a hybrid vehicle, including an electric oil pump, a pressure control valve, which includes an input port receiving fluid discharged from the electric oil pump, an output port outputting the fluid to a transmission while adjusting the pressure of the fluid, and a drain port discharging a portion of the fluid in accordance with adjustment of the pressure of the fluid, a first motor cooling path connecting the drain port of the pressure control valve to a first motor forming a hybrid powertrain, and a controller electrically connected to the electric oil pump and configured for controlling the electric oil pump to cool the transmission and the first motor.

The transmission may be provided with a second motor forming the hybrid powertrain, an engine clutch may be provided between the first motor and the second motor, and a flow rate control device may be connected to the output port of the pressure control valve to control the state in which a portion of the fluid which is supplied from the pressure control valve to the transmission is supplied to the second motor and the engine clutch.

The flow rate control device may be implemented as an on/off solenoid valve electrically connected to the controller and configured to switch between a first state in which the fluid output from the pressure control valve is directly supplied to the second motor and the engine clutch and a second state in which the fluid output from the pressure control valve is supplied to the second motor and the engine clutch via an orifice.

When the temperature of the first motor exceeds a predetermined first reference temperature, the controller may be configured to determine an incremental number of revolutions per minute (RPM) of the electric oil pump and a maintenance time to increase the RPM of the electric oil pump, may increase the RPM of the electric oil pump by the incremental RPM, and may maintain the increased RPM for the maintenance time.

The incremental RPM may be determined depending on at least one of the present power consumption of the first motor or the temperature increase rate of the first motor.

After the maintenance time elapses, when the temperature of the first motor is less than a predetermined second reference temperature which is lower than the first reference temperature, the controller may decrease the RPM of the electric oil pump by the incremental RPM.

When the second motor requires cooling, the controller may be configured to control the on/off solenoid valve such that the fluid output from the pressure control valve is directly supplied to the second motor and the engine clutch, and may increase the RPM of the electric oil pump in proportion therewith.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
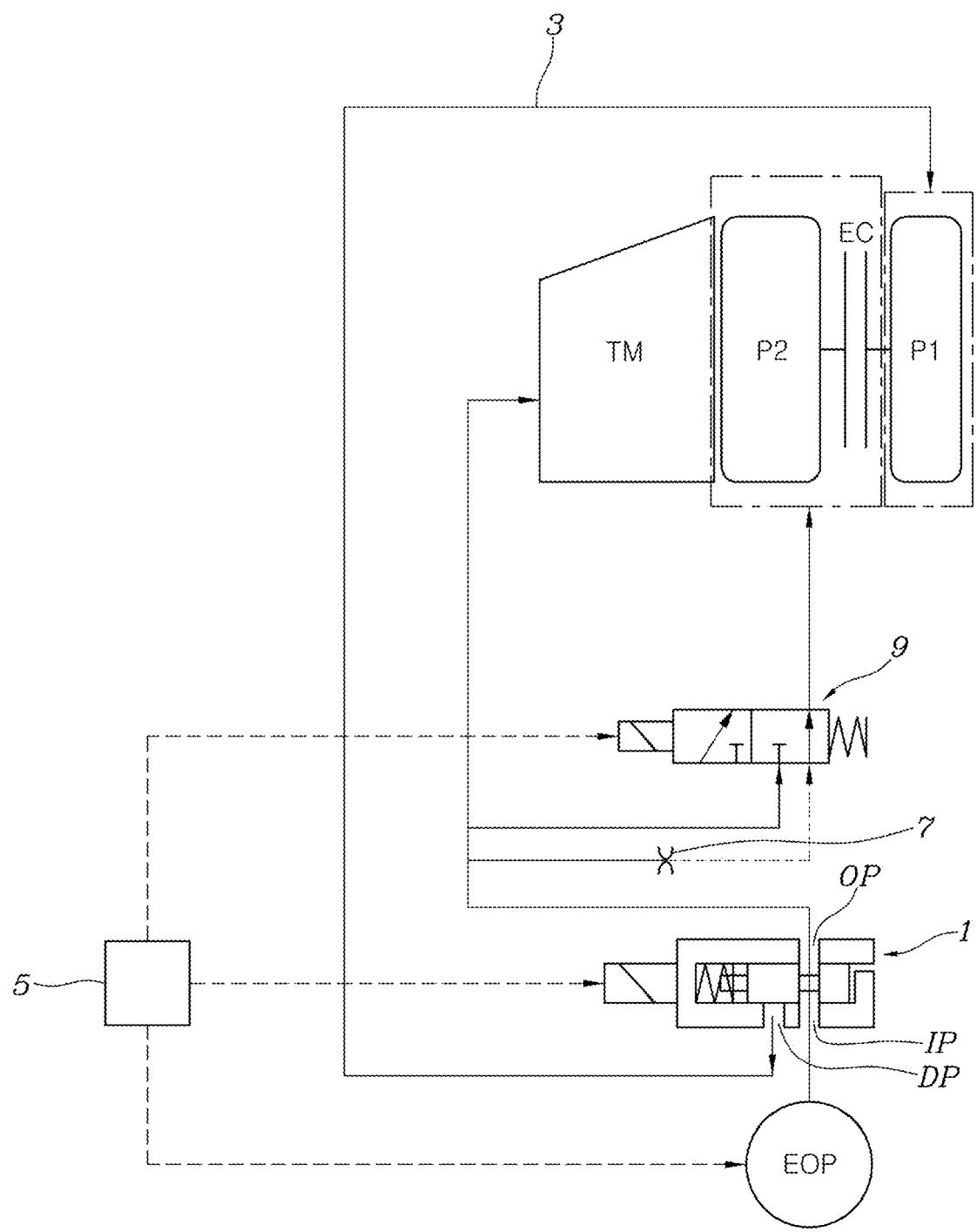
FIG. 1 is a conceptual diagram showing a powertrain-cooling system of a hybrid vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Various exemplary embodiments will now be described more fully with reference to the accompanying drawings, in which only some exemplary embodiments are shown. Specific structural and functional details disclosed herein are merely representative for describing exemplary embodiments. The present invention, however, may be embodied in many alternative forms, and may not be construed as being limited only to the exemplary embodiments set forth herein.

Accordingly, while exemplary embodiments of the present invention are capable of being variously modified and taking alternative forms, embodiments thereof are shown by way of example in the drawings and will herein be described in detail. It should be understood, however, that there is no intent to limit the present invention to the exemplary embodiments disclosed. On the other hand, various exemplary embodiments are to cover all modifications, equivalents, and alternatives falling within the scope of the present invention.

It will be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of exemplary embodiments of the present invention.

It will be understood that when an element is referred to as being "connected" or "coupled" to another element, it may be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing various exemplary embodiments only and is not intended to be limiting of exemplary embodiments of the present invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, various exemplary embodiments of the present invention will be described with reference to the accompanying drawings. In the drawings, the same reference numerals refer to the same components.

Figure 2:
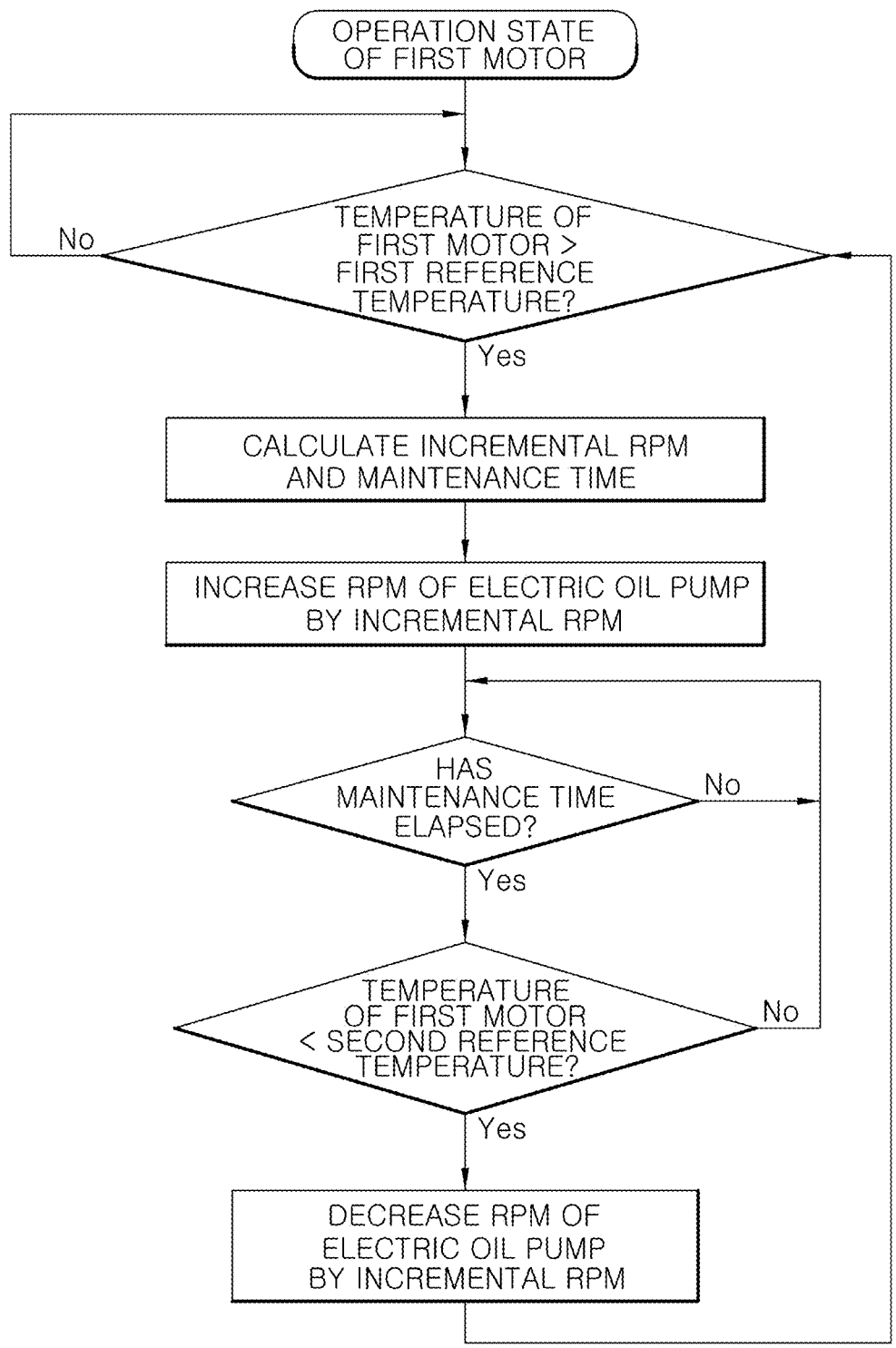
FIG. 2 is a flowchart illustrating the control process of a controller of the cooling system according to various exemplary embodiments of the present invention.

Referring to FIG. 1 and FIG. 2, a powertrain-cooling system for a hybrid vehicle according to various exemplary embodiments of the present invention may include an electric oil pump EOP; a pressure control valve 1 including an input port IP receiving fluid discharged from the electric oil pump EOP, an output port OP outputting the fluid to a transmission TM while adjusting the pressure of the fluid, and a drain port DP discharging a portion of the fluid in accordance with adjustment of the pressure of the fluid; a first motor cooling path 3 connecting the drain port DP of the pressure control valve 1 to a first motor P1 forming a hybrid powertrain; and a controller 5 controlling the electric oil pump EOP to cool the transmission TM and the first motor P1.

That is, the present invention is configured such that, when the electric oil pump EOP pumps the fluid to supply the same to the transmission TM, the surplus fluid remaining after supplying the fluid to the transmission TM is supplied to the first motor P1 through the first motor cooling path 3. Lubrication and cooling of the transmission TM are reliably secured, and the electric oil pump EOP is driven to pump more fluid than is required for the transmission TM to cool the first motor P1 as needed.

For example, transmission oil or automatic transmission fluid (ATF) is typically used as the fluid. The fluid is used for cooling and lubrication of the first motor P1 as well as the transmission TM.

The transmission TM is provided with a second motor P2 forming the hybrid powertrain. An engine clutch EC is provided between the first motor P1 and the second motor P2. A flow rate control device is connected to the output port OP of the pressure control valve 1 to control the state in which a portion of the fluid which is supplied from the pressure control valve 1 to the transmission TM is supplied to the second motor P2 and the engine clutch EC.

That is, the hybrid powertrain shown in FIG. 1 is configured such that the first motor P1 is connected to the engine, the first motor P1 and the second motor P2 are connected to each other via the engine clutch EC, and the second motor P2 is connected to the transmission TM.

The first motor P1 may require a higher flow rate of cooling fluid than the second motor P2. To meet the present requirement, the present invention is configured to enable smooth and stable cooling of the first motor P1.

The flow rate control device may be implemented as an on/off solenoid valve 9, which switches between a state in which the fluid output from the pressure control valve 1 is directly supplied to the second motor P2 and the engine clutch EC and a state in which the fluid output from the pressure control valve 1 is supplied to the second motor P2 and the engine clutch EC via an orifice 7.

Although the orifice 7 is illustrated in FIG. 1 as being provided separately, the exemplary embodiment is not limited thereto. The orifice 7 may be integrally formed with the on/off solenoid valve 9.

When a request for cooling of the second motor P2 or the engine clutch EC is relatively small, the controller 5 controls the on/off solenoid valve 9 to supply the fluid to the second motor P2 and the engine clutch EC via the orifice 7, preventing unnecessary consumption of the fluid.

When the request for cooling of the second motor P2 or the engine clutch EC becomes large, the controller 5 controls the on/off solenoid valve 9 to directly supply the fluid output from the pressure control valve 1 to the second motor P2 and the engine clutch EC without passing the fluid through the orifice 7, satisfying the desired cooling request.

At the present time, the controller 5 increases the number of revolutions per minute (RPM) of the electric oil pump EOP such that the electric oil pump EOP pumps a greater amount of fluid in proportion to the flow rate of fluid supplied to the second motor P2 and the engine clutch EC, so that the flow rate of fluid supplied to the transmission TM or the first motor P1 is maintained as it is.

The pressure control valve 1 is configured to be controlled by the controller 5 using a solenoid. Thus, the controller 5 controls the pressure at which the pressure control valve 1 opens the drain port DP.

When the temperature of the first motor P1 exceeds a predetermined first reference temperature, the controller 5 determines an incremental RPM of the electric oil pump EOP and a maintenance time to increase the RPM of the electric oil pump EOP, increases the RPM of the electric oil pump EOP by the incremental RPM, and maintains the increased RPM for the maintenance time.

In an exemplary embodiment of the present invention, the temperature of the first motor P1 is detected by a temperature sensor connected to the controller 5.

The first reference temperature is a temperature based on which whether to actively cool the first motor P1 by increasing the flow rate of fluid supplied thereto is determined. The first reference temperature may be designed and determined through repeated experimentation and analysis in consideration of the specifications and durability of the first motor P1.

The incremental RPM may be determined depending on at least one of the present power consumption of the first motor P1 or the temperature increase rate of the first motor P1.

That is, the greater the power consumption or the temperature increase rate of the first motor P1, the greater the incremental RPM. A map representing the relationship between the incremental RPM and the power consumption, a map representing the relationship between the incremental RPM and the temperature increase rate, or a map representing the relationships between the incremental RPM, the power consumption and the temperature increase rate may be set in advance through repeated experimentation and analysis, and the controller 5 may determine a required incremental RPM using the map.

Furthermore, similar to the incremental RPM, the maintenance time may be determined depending on at least one of the power consumption of the first motor P1 or the temperature increase rate of the first motor P1. For simplicity, the maintenance time may be set in advance to the time required to cool the first motor P1 to a certain level taking into consideration the thermal capacity of the first motor P1.

After the maintenance time elapses, when the temperature of the first motor P1 is less than a predetermined second reference temperature, which is lower than the first reference temperature, the controller 5 decreases the RPM of the electric oil pump EOP by the incremental RPM.

That is, when the first motor P1 is sufficiently cooled and the temperature thereof drops below the second reference temperature due to the increase in the RPM of the electric oil pump EOP and the resulting supply of the fluid thereto through the first motor cooling path 3, the controller 5 returns the RPM of the electric oil pump EOP to the state before the same was increased, preventing unnecessary consumption of energy by the electric oil pump EOP.

Here, the second reference temperature may be preferably set to such an extent that the first motor P1 is sufficiently cooled so that it does not become necessary to again increase the RPM of the electric oil pump EOP, securing hysteresis characteristics in which the RPM of the electric oil pump EOP is prevented from increasing and decreasing too frequently.

Figure 3:
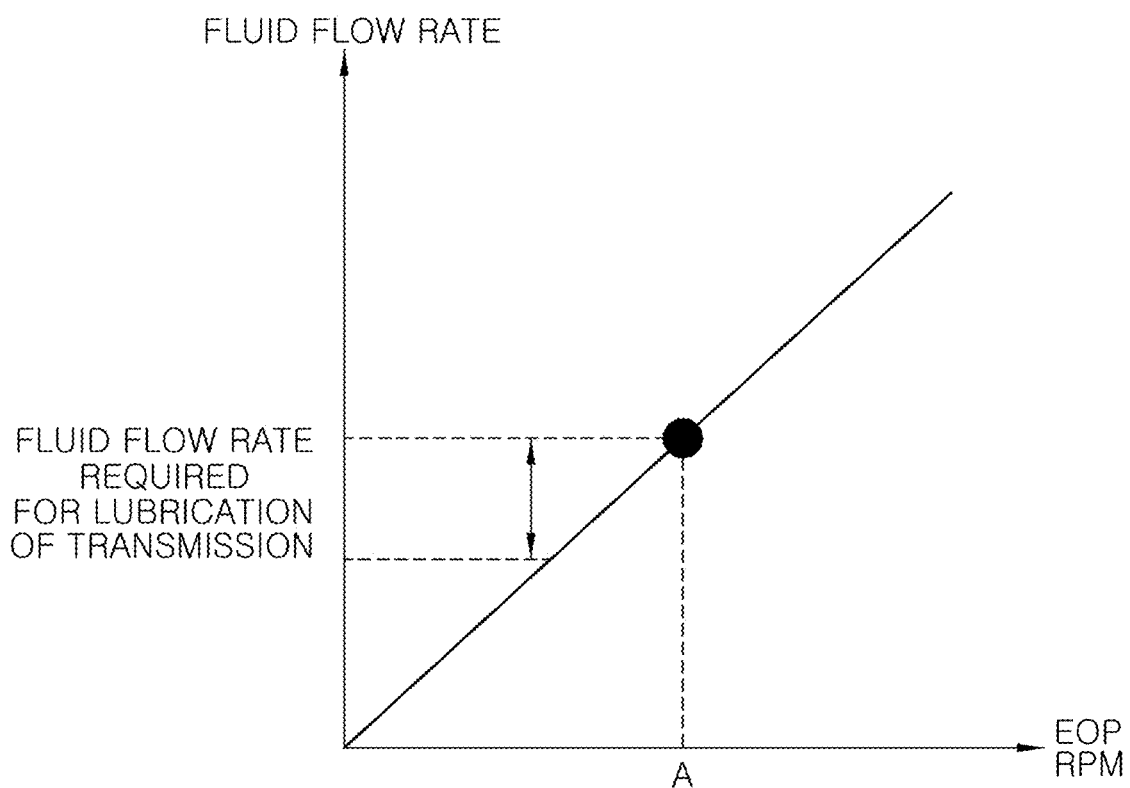
FIG. 3, FIG. 4, and FIG. 5 are graphs showing the relationship between the RPM of an electric oil pump and a flow rate of fluid depending on the travel situation of a vehicle.

FIG. 3 is a diagram showing the relationship between the RPM of the electric oil pump EOP and the flow rate of lubricating and cooling fluid supplied to the transmission TM when neither the first motor P1 nor the second motor P2 requires additional cooling. Referring to FIG. 3, as the RPM of the electric oil pump EOP increases, the flow rate of fluid supplied to the transmission TM increases until the drain port DP of the pressure control valve 1 is opened, as indicated by the point A.

That is, as the RPM of the electric oil pump EOP increases, the transmission TM receives more and more fluid, and when the RPM of the electric oil pump EOP reaches the point A, the transmission TM requires no more fluid, and the fluid is discharged through the drain port DP. If the first motor P1 does not require additional cooling, the controller 5 performs control such that the RPM of the electric oil pump EOP increases only up to the point A, so only the flow rate of fluid required for the transmission TM is secured.

Figure 4:
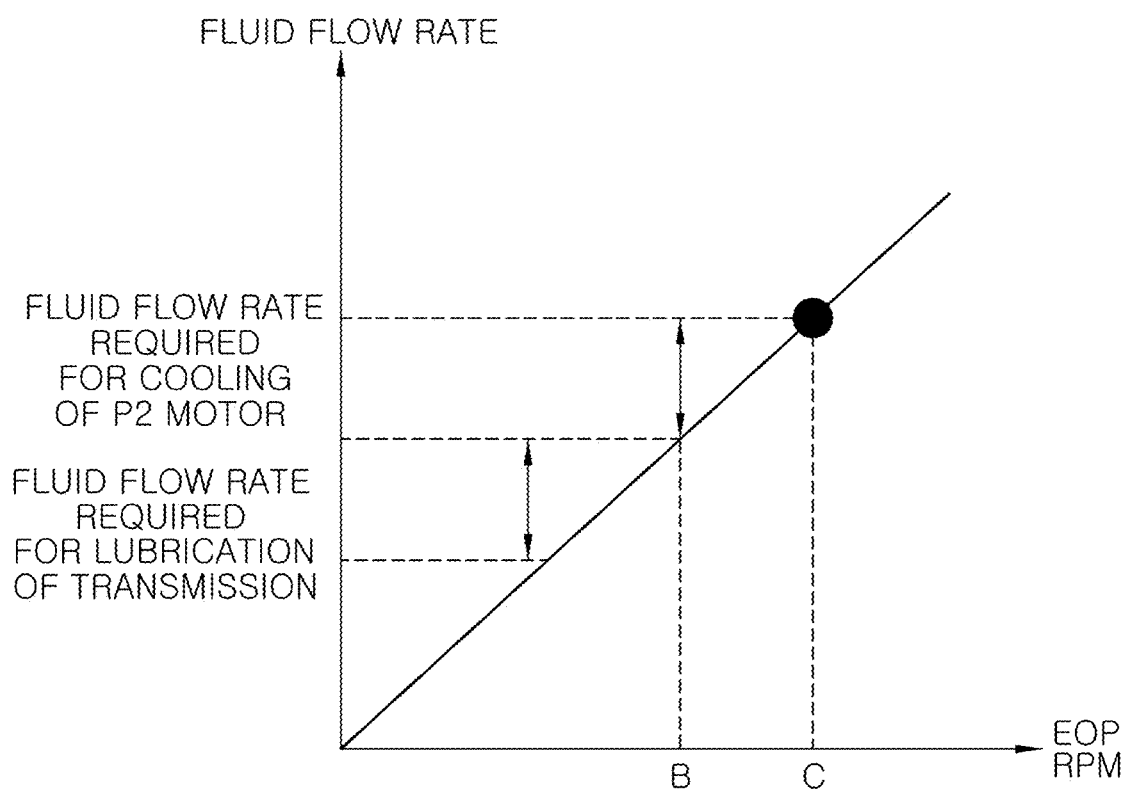

FIG. 4 is a diagram showing the situation in which the first motor P1 does not require additional cooling but the second motor P2 requires additional cooling. In the state of completely securing the flow rate of fluid required for the transmission TM by increasing the RPM of the electric oil pump EOP, as indicated by the point B, the controller 5 operates the on/off solenoid valve 9 so that the fluid output from the pressure control valve 1 is directly supplied to the second motor P2 and the engine clutch EC without passing through the orifice 7, and performs control such that the RPM of the electric oil pump EOP further increases in proportion to the flow rate of cooling fluid required for the second motor P2 and the engine clutch EC.

That is, the powertrain-cooling system of a hybrid vehicle according to various exemplary embodiments of the present invention secures the flow rate of fluid required for the transmission TM, and additionally secures the flow rate of fluid required for the second motor P2 as needed.

If the controller 5 continues to increase the RPM of the electric oil pump EOP to the point C, both the flow rate of fluid required for the transmission TM and the flow rate of fluid required for the second motor P2 and the engine clutch EC are secured. At the instant time, the drain port DP of the pressure control valve 1 is opened, and the drained fluid is supplied to the first motor P1 through the first motor cooling path 3. However, if the first motor P1 does not require additional cooling, the controller 5 performs control such that the RPM of the electric oil pump EOP increases only up to the point C.

Figure 5:
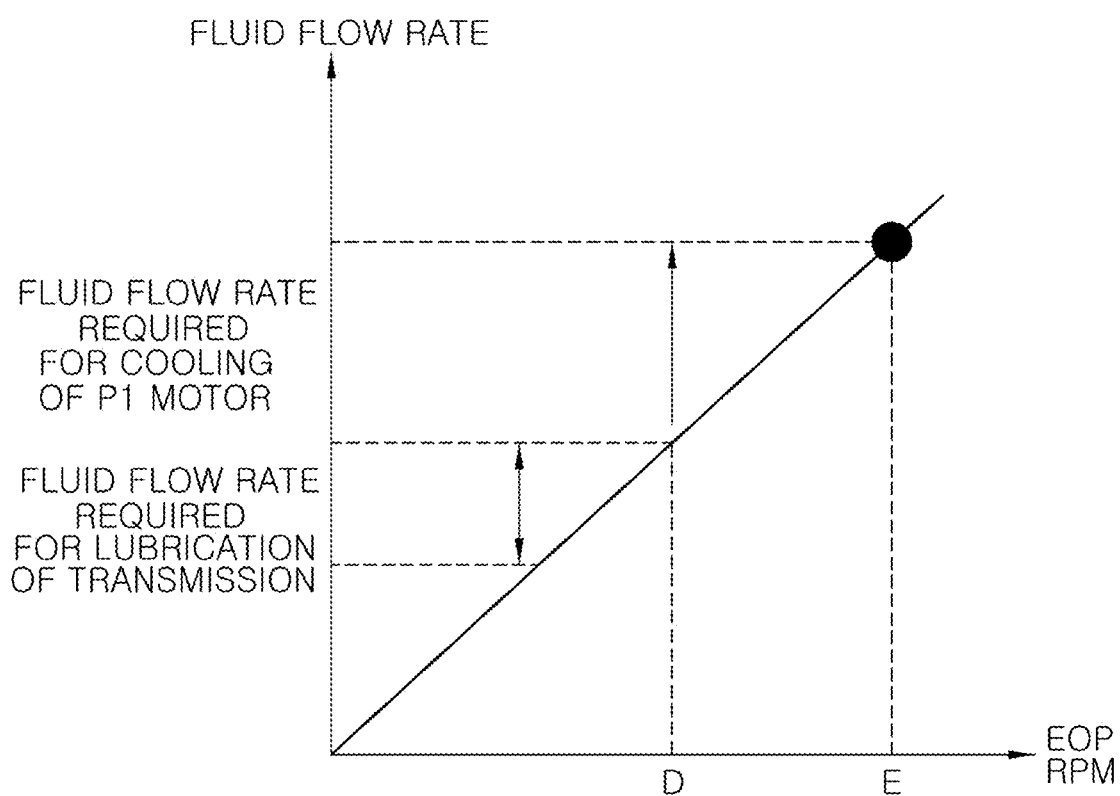

FIG. 5 is a diagram showing the situation in which the second motor P2 does not require additional cooling but the first motor P1 requires additional cooling. In the state of securing the flow rate of fluid required for the transmission TM by increasing the RPM of the electric oil pump EOP, as indicated by the point D, the controller 5 opens the drain port DP of the pressure control valve 1 so that the surplus fluid remaining after supplying the fluid to the transmission TM is supplied to the first motor P1 through the first motor cooling path 3 to cool the first motor P1. The controller 5 increases the RPM of the electric oil pump EOP to the point E at which the flow rate of cooling fluid required for the first motor P1 is completely secured.

The point E may be set to a sufficiently large value within the range of the maximum RPM of the electric oil pump EOP, which is determined in accordance with the durability of the electric oil pump EOP, to satisfy the flow rate of cooling liquid required for the first motor P1. Therefore, the hybrid powertrain, in which the first motor P1 requires a high flow rate of cooling fluid, may be imparted with high cooling performance.

Figure 6:
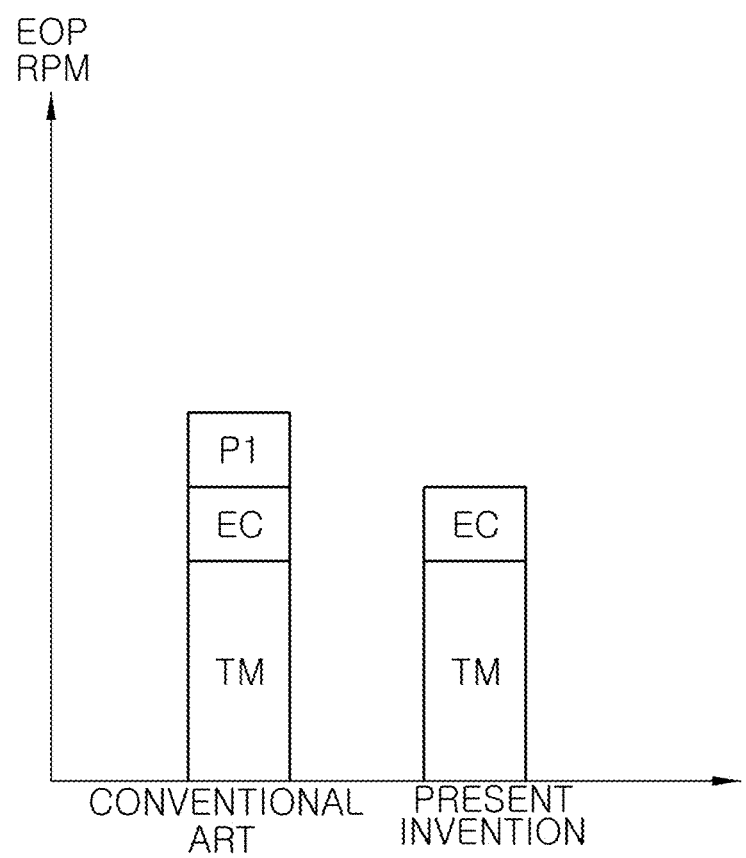
FIG. 6, FIG. 7, and FIG. 8 are graphs showing a comparison of the RPM of the electric oil pump between an example of the related art and the present invention depending on the travel situation of a vehicle.

FIG. 6 is a conceptual diagram showing a comparison of the RPM of the electric oil pump EOP between an example of the related art and the present invention in the state in which neither the first motor P1 nor the second motor P2 requires additional cooling (refer to FIG. 3), for example, in the state in which the vehicle is driven using only the engine.

The related art set forth herein is configured to cool not only the transmission TM, the second motor P2 and the engine clutch EC but also the first motor P1 using the fluid supplied from the output port OP of the pressure control valve 1.

In the present related art, when the flow rate of cooling fluid required for the transmission TM is satisfied, the surplus fluid is supplied to the first motor P1, and thus it is required to drive the electric oil pump EOP at a higher RPM than that in the case of the present invention to satisfy the flow rate of fluid required for the transmission TM.

Figure 7:
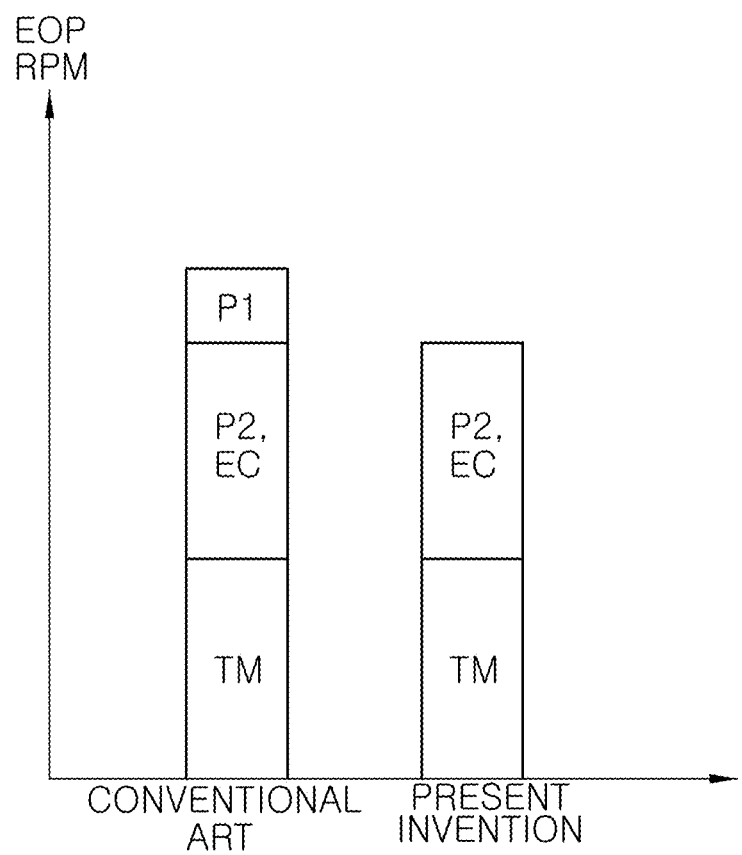

FIG. 7 is a conceptual diagram showing a comparison of the RPM of the electric oil pump EOP between the related art and the present invention in the state in which the second motor P2 requires cooling and the first motor P1 does not require cooling (refer to FIG. 4). In the related art, when the flow rates of cooling fluid required for the transmission TM and the second motor P2 are satisfied, the surplus fluid is pumped and is supplied to the first motor P1, and thus the RPM of the electric oil pump EOP becomes higher than that in various exemplary embodiments of the present invention.

Figure 8:
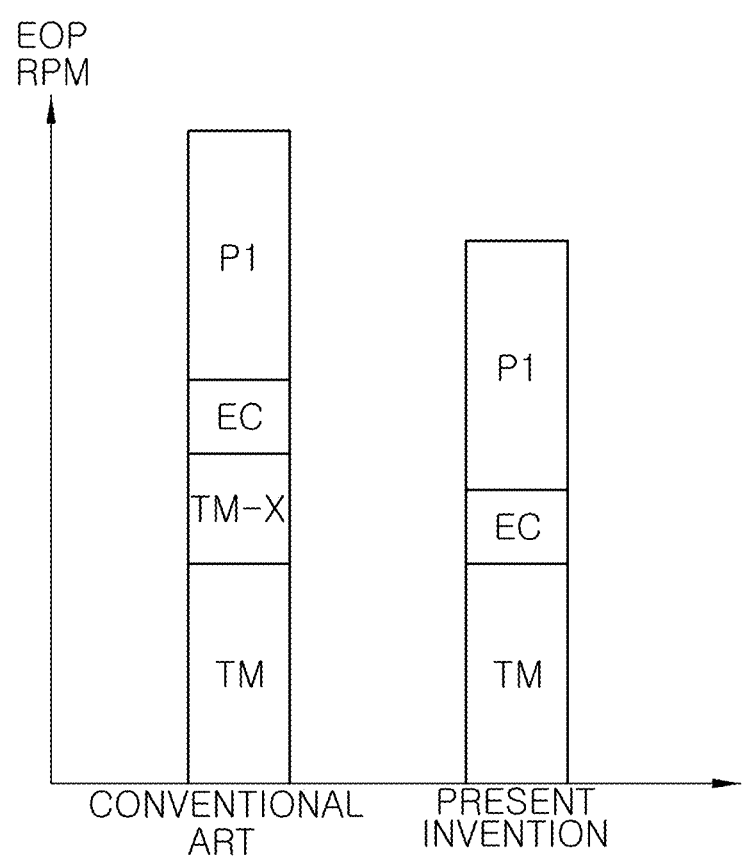

FIG. 8 is a conceptual diagram showing a comparison of the RPM of the electric oil pump EOP between the related art and the present invention in the state in which the first motor P1 requires cooling and the second motor P2 does not require cooling (refer to FIG. 5). In the related art, to secure the flow rate of cooling fluid required for the first motor P1, the flow rate of fluid supplied to the transmission TM is unnecessarily higher than the actually required flow rate of fluid by a certain amount TM–X, and thus the RPM of the electric oil pump EOP becomes higher than that in various exemplary embodiments of the present invention.

As described above, the powertrain-cooling system of a hybrid vehicle according to various exemplary embodiments of the present invention is configured for individually securing a sufficient flow rate of fluid required for each of a plurality of components requiring cooling, such as the transmission TM, the first motor P1, the second motor P2, and the engine clutch EC, and of increasing the RPM of the electric oil pump EOP only up to a level necessary to secure the flow rate of fluid required for each of the components requiring cooling, minimizing the operation of the electric oil pump EOP while sufficiently securing the required flow rate of cooling fluid, thus improving the fuel efficiency of the vehicle.

As is apparent from the above description, according to a powertrain-cooling system of a hybrid vehicle, it is possible to cool a motor, forming a hybrid powertrain, simultaneously with a transmission without a separate cooling device, to increase motor-cooling performance by controlling the flow rate of cooling fluid supplied to the motor separately from the flow rate of cooling fluid supplied to the transmission, and to improve the fuel efficiency of the vehicle by minimizing drive loss of an electric oil pump configured for supplying the cooling fluid.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain-cooling system of a vehicle, the powertrain-cooling system comprising:
    an electric oil pump;
    a pressure control valve including an input port receiving a fluid discharged from the electric oil pump, an output port outputting the fluid to a transmission while adjusting a pressure of the fluid, and a drain port discharging a portion of the fluid according to adjustment of the pressure of the fluid;
    a first motor cooling path connecting the drain port of the pressure control valve to a first motor forming a hybrid powertrain; and
    a controller electrically connected to the electric oil pump and configured for controlling the electric oil pump to cool the transmission and the first motor,
    wherein the transmission is provided with a second motor forming the hybrid powertrain,
    wherein an engine clutch is mounted between the first motor and the second motor, and
    wherein a flow rate control device is connected to the output port of the pressure control valve to control a state in which a portion of the fluid which is supplied from the pressure control valve to the transmission is supplied to the second motor and the engine clutch.

2. The powertrain-cooling system of claim 1,
    wherein the flow rate control device includes an on/off solenoid valve electrically connected to the controller and configured to switch the on/off solenoid valve between a first state in which the fluid output from the pressure control valve is directly supplied to the second motor and the engine clutch and a second state in which the fluid output from the pressure control valve is supplied to the second motor and the engine clutch via an orifice.

3. The powertrain-cooling system of claim 2,
    wherein the on/off solenoid valve includes a first input port directly connected to the output port of the pressure control valve and a second input port connected to the orifice connected to the output port of the pressure control valve in parallel to the first input port.

4. The powertrain-cooling system of claim 2,
    wherein, upon determining that a temperature of the first motor exceeds a predetermined first reference temperature, the controller is configured to determine an incremental number of revolutions per minute (RPM) of the electric oil pump and a maintenance time to increase the RPM of the electric oil pump, increases the RPM of the electric oil pump by the incremental RPM, and maintains the increased RPM for the maintenance time.

5. The powertrain-cooling system of claim 4,
    wherein the incremental RPM is determined according to at least one of a present power consumption of the first motor or a temperature increase rate of the first motor.

6. The powertrain-cooling system of claim 4,
    wherein, after the maintenance time elapses, upon determining that the temperature of the first motor is less than a predetermined second reference temperature which is lower than the first reference temperature, the controller is configured to decrease the RPM of the electric oil pump by the incremental RPM.

7. The powertrain-cooling system of claim 4,
    wherein, when the second motor requires relatively large cooling, the controller is configured to switch the second state of the on/off solenoid valve to the first state thereof so that the fluid output from the pressure control valve is directly supplied to the second motor and the engine clutch, and to increases the RPM of the electric oil pump in proportion to a flow rate of the fluid supplied to the second motor and the engine clutch.

8. The powertrain-cooling system of claim 4,
    wherein, when the second motor requires relatively small cooling, the controller is configured to switch the first state of the on/off solenoid valve to the second state thereof so that the fluid output from the pressure control valve is supplied to the second motor and the engine clutch via the orifice.

9. A method of controlling a powertrain-cooling system having an electric oil pump, a pressure control valve including an input port receiving a fluid discharged from the electric oil pump, an output port outputting the fluid to a transmission while adjusting a pressure of the fluid, and a drain port discharging a portion of the fluid according to adjustment of the pressure of the fluid, a first motor cooling path connecting the drain port of the pressure control valve to a first motor forming a hybrid powertrain, a controller electrically connected to the electric oil pump and configured for controlling the electric oil pump to cool the transmission and the first motor, a second motor forming the hybrid powertrain, an engine clutch mounted between the first motor and the second motor, wherein a flow rate control device is connected to the output port of the pressure control valve to control a state in which a portion of the fluid which is supplied from the pressure control valve to the transmission is supplied to the second motor and the engine clutch, the method comprising:
    determining whether a temperature of the first motor exceeds a predetermined first reference temperature;
    wherein, upon concluding that the temperature of the first motor exceeds the predetermined first reference temperature, determining an incremental number of revolutions per minute (RPM) of the electric oil pump and a maintenance time;
    increasing the RPM of the electric oil pump by the determined incremental RPM; and
    maintaining the increased RPM for the maintenance time.

10. The method of claim 9,
    wherein the incremental RPM is determined according to at least one of a present power consumption of the first motor or a temperature increase rate of the first motor.

11. The method of claim 9, further including:
    after the maintenance time elapses and upon determining that the temperature of the first motor is less than a predetermined second reference temperature which is lower than the first reference temperature, decreasing, by the controller, the RPM of the electric oil pump by the incremental RPM.

12. The method of claim 9,
    wherein the flow rate control device is electrically connected to the controller and the controller is configured to switch the flow rate control device between a first state in which the fluid output from the pressure control valve is directly supplied to the second motor and the engine clutch and a second state in which the fluid output from the pressure control valve is supplied to the second motor and the engine clutch via an orifice.

13. The method of claim 12, wherein, when the second motor requires relatively large cooling, the controller is configured to switch the second state of the flow rate control device to the first state thereof so that the fluid output from the pressure control valve is directly supplied to the second motor and the engine clutch, and to increases the RPM of the electric oil pump in proportion to a flow rate of the fluid supplied to the second motor and the engine clutch.

14. The powertrain-cooling system of claim 12, wherein, when the second motor requires relatively small cooling, the controller is configured to switch the first state of the flow rate control device to the second state thereof so that the fluid output from the pressure control valve is supplied to the second motor and the engine clutch via the orifice.

15. A non-transitory computer readable storage medium on which a program for performing the method of claim 9 is recorded.

\* \* \* \* \*